UNITED STATES PATENT OFFICE.

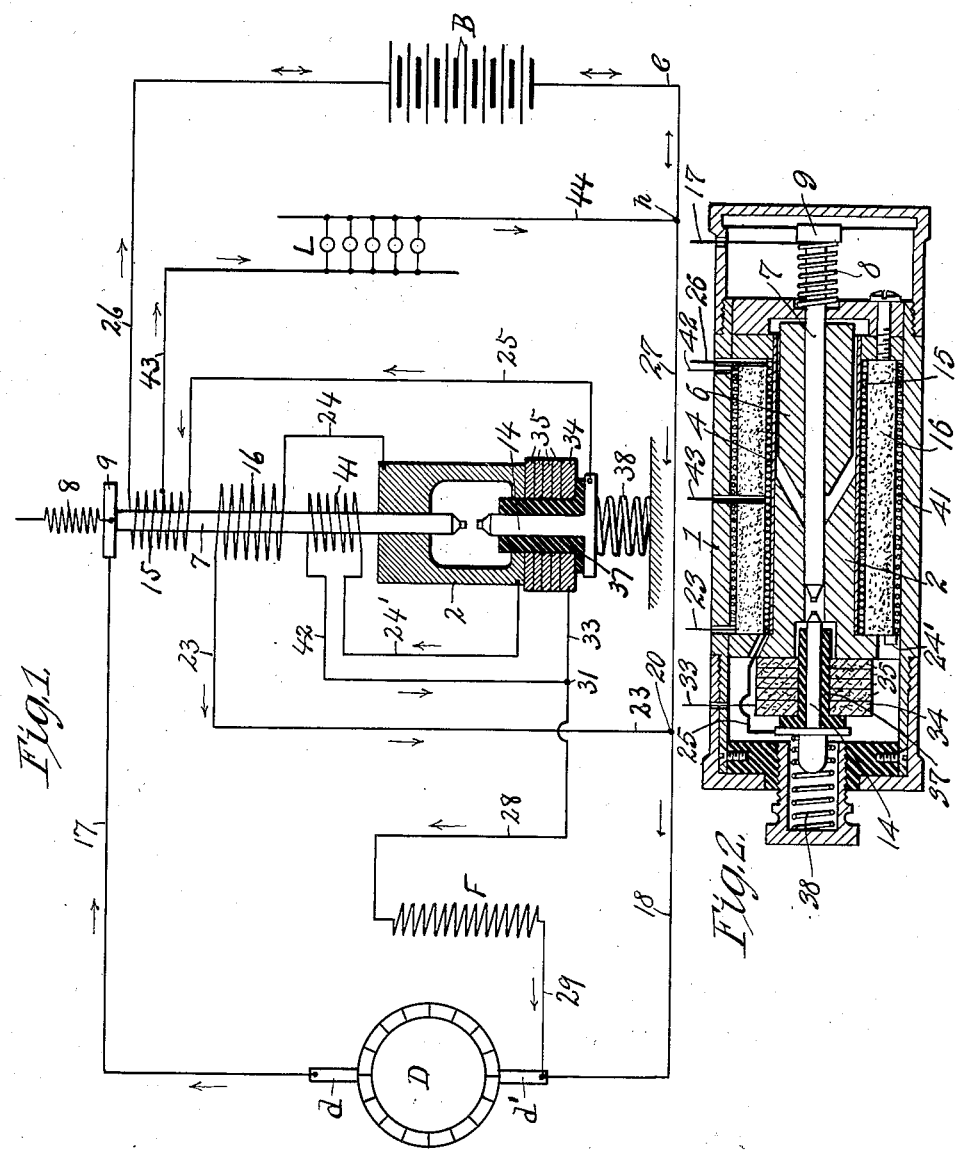

ALBERT E. DOMAN, OF ELBRIDGE, NEW YORK, ASSIGNOR, BY MESNE ASSIGNMENTS, TO DYNETO ELECTRIC CORPORATION, OF SYRACUSE, NEW YORK, A CORPORATION OF NEW YORK.

AUTOMATIC REGULATOR FOR COMBINED DYNAMO AND STORAGE-BATTERY CIRCUITS.

1,238,896. Specification of Letters Patent. Patented Sept. 4, 1917.

Application filed September 9, 1911. Serial No. 648,587.

*To all whom it may concern:*

Be it known that I, ALBERT E. DOMAN, of Elbridge, in the county of Onondaga, in the State of New York, have invented new and useful Improvements in Automatic Regulators for Combined Dynamo and Storage-Battery Circuits, of which the following, taken in connection with the accompanying drawings, is a full, clear, and exact description.

This invention relates to certain improvements in automatic regulators for combined dynamo and storage battery circuits as used more particularly in motor vehicles for operating a system of lamps or other translating devices, and in which the dynamo is automatically connected to the storage battery at a definite dynamo voltage through the medium of an electro-magnetic voltage coil and a suitable circuit closer actuated thereby.

The dynamo is driven by the propelling power or engine of the vehicle and is, therefore, driven at widely varying speeds corresponding to the varying speeds of the engine so that if the current output were not regulated, it would vary in direct proportion to the speed.

The main object of the regulator is to cause the dynamo to produce the greatest possible current output under a minimum speed, as for example when the machine is driven slowly, and on the other hand to automatically limit such current output to approximately that required to operate the lamps or other translating devices commonly used in machines of this character, and to supply enough additional current to bring the battery up to full charge as the speed of the dynamo increases beyond that which is necessary to meet the requirements above-mentioned.

Another object is to allow the current from the dynamo to flow into the battery at all times when the dynamo voltage exceeds that of the battery and to automatically break the dynamo circuit to the battery when its voltage falls below that of said battery.

Other objects and uses relating to specific parts of the apparatus will be brought out in the following description.

In the drawings Figure 1 is a diagrammatic view, partly in section, of a motor-driven dynamo circuit and a storage battery circuit, together with my improved regulator and translating devices connected in both circuits. Fig. 2 is a sectional view of the assembled parts of the regulator, exclusive of the circuits, dynamo and storage battery.

This regulator consists essentially of a hollow core section —2— and a co-axial core rod —7— of electric conducting material movable axially and coöperating with a conductor —14— to form a circuit closer, the meeting ends of the members —7— and —14— having coöperative contacts for a purpose hereinafter described, said member —7— being normally withdrawn from contact with the conductor —14— by a retracting spring —8—.

The operation of the core rod —7— against the action of the spring —8— is influenced by one or more of a series of, in this instance three, co-axial and concentric coils —15—, —16— and —41—, all surrounding the core rod.

The inner coil —15— nearest the core rod is made up of relatively few turns of comparatively coarse wire, Fig. 2 while the coil —16— surrounding the coil —15— consists of a relatively large number of turns of comparatively fine wire, the coil —41— being placed around the coil —16— and constitutes what will be hereinafter termed a resistance coil.

The conductor —14— is supported in an insulating sleeve —37— co-axial with the core rod —7—, said insulating sleeve being firmly secured in the outer end of the core section —2— and constitutes a support for a resistance pile consisting, in this instance, of co-axial carbon disks —34— and —35— which are interposed between the flanged outer end of the insulator —37— and adjacent end of the core section —2—, and are normally spring-pressed in close contact with each other and with the adjacent end of the core section —2— by a compression spring —38— of sufficient tension to reduce the resistance between the carbon disks to a minimum.

It is now evident that when the coöperative contacts on the ends of the conductors —7— and —14— are in their normal positions, slightly spaced apart, they will be insulated one from the other and the spring —38— will exert its full pressure upon the carbon disks —34— and —35— to reduce the resistance at their meeting faces to the lowest degree necessary for the successful operation of the regulator.

It is also evident that if the core rod —7— is drawn endwise against the action of the spring —8— under the magnetic influence of one or more of the coils —15—, —16— or —41—, so as to bring it into contact with the conductor —14—, these conductors will be electrically connected and the conductor —14— will be moved endwise against the action of the spring —38—, thus increasing the resistance between the meeting faces of the disks —34— and —35—.

This action of the coöperative contacts —7— and —14— and carbon disks is utilized in the automatic regulation and control of the several circuits as follows: A motor-driven dynamo —D— has one of its poles —d— connected by a wire —17— to the outer end of the core rod —7— which is in sliding electric connection with the core section —2—, the latter being connected by a wire —24— to one end of the coil —16—, the other end of said coil being connected by return wires —23— and —18— to the other pole —d'— of the dynamo, thus completing the circuit through the coil —16— which causes the core —7— to move endwise into contact with the conductor —14—, thus closing the circuit through the coöperative contacts on the adjacent ends of the conductor —7— and —14—.

The conductor —14— is connected by a wire —25— to one end of the coil —15— having its opposite end connected to one pole of a storage battery —B—, the other pole of which is connected by wires —e— and —27— to the wire —18—, thus connecting the storage battery in circuit with the dynamo for charging purposes and also for another purpose hereinafter described.

The coils —15— and —16— are wound in the same direction and, therefore, under the conditions just described, act in harmony so that the energizing of the coil —15— exerts additional magnetic pull upon the member —7— against the action of the retracting spring —8— to press the adjacent ends of the members —7— and —14— together with greater force sufficient to overcome the normal action of the spring —38—, thereby releasing the disks —34— and —35— from close contact and increasing the resistance between their meeting faces.

It is now clear that the pressure of the core rod —7— upon the conductor —14— increases with an increased voltage of the dynamo, while the resistance between the carbon disks —34— and —35— is correspondingly increased and this variable resistance is utilized in further control of circuits as follows: The core section —2— is connected by a wire —24'— to one end of the coil —41— having its opposite end connected by wires —42— and —28— to one end of the shunt field winding, as —F—, of the motor, the other end of the shunt field winding being connected by a wire —29— to the pole —d'— of the dynamo, while the outer carbon disk —34— is connected by a wire —33— to the wire —28— and hence to the shunt field winding —F—, thus placing the resistance coil —41— and resistance disks —34— and —35— in multiple with each other and in series with the shunt field winding.

The resistance in the shunt field circuit of the dynamo will, therefore, be variable and will produce a corresponding variation in the voltage or output of the generator and it is upon this principle that the regulator operates.

The translating devices such as incandescent electric lamps —L— are connected in circuit with the dynamo and also with the battery, one side of the light circuit being connected by a wire —43— to the coil —15— at a point intermediate its ends, while the other side is connected by wires —44—, —27— and —18— to the pole —d'— of the dynamo and by wires —44— and —e— to one pole of the battery —B—.

It is now clear that if the translators —L— are cut out of the circuit, the current from the dynamo will charge the battery through the wires —17—, conductors —7— and —14—, wire —25—, coil —15—, wire —26— to one pole of the battery, thence from the other pole of the battery through wires —e—, —27— and —18— and return to the dynamo, the current output of the dynamo being automatically regulated by the variable resistance between the carbon disks —34— and —35—, such automatic regulation continuing whether the lights are off or on.

Now, if the lights are thrown on and the voltage in the charging circuit exceeds that of the battery, then a portion of the current generated by the dynamo will pass through the wire —43— to the lights and return by the wires —44—, —27—, and —18— to the dynamo.

On the other hand, if the dynamo is at rest or driven at a relatively low speed, as for example when driving the car slowly, the electromagnetic effect of the coil —16— would be insufficient to draw the core rod —7— into contact with the contact member —14— against the action of the spring —8— and would, therefore, leave the dynamo circuit to the battery and electric lamps open or broken, while the voltage of the battery would be in excess of that produced by the generator, under which conditions the battery would discharge through the wire —26— and portion of the coil —15— to the point of connection of the wire —43— and thence through the wire —43— and lamps and return through the wires —44— and —e— to the battery, thereby opposing the included portion of the coil 15 to the magnetic attraction of the remaining coils, so that if the magnetic pull of the coil —16— should be increased by the increased speed of the dynamo sufficiently to force the core rod —7— into contact with the member —14—, thus closing the circuit through the remaining part of the coil —15—, the magnetic effect of the battery circuit through its part of the coil —15— would be offset by that of the remaining part of the coil which would then be in the dynamo circuit when the wire —43— is connected substantially midway between the ends of said coil, as shown in the drawings. If the voltage of the dynamo is substantially equal to that of the battery, it is evident that the lamps will be supplied with current from both the dynamo and battery, that is a part of the dynamo current will pass through the wire —17— and members —7— and —14—, wire —25— and a part of the coil —15— to the point of connection of the wire —43— therewith, and return through wires —27— and —18— to the dynamo, while the battery current will pass through the remaining part of the same coil and thence through the wire —43—, lamps —L—, wire —44— and return through the wire —e— to the battery.

It will now be readily understood that when the dynamo is in operation, an increase of current in the coil —15— will tend to release the pressure upon the carbon disks which will increase the effective resistance in the shunt field circuit and this in turn will cause a reduction of output of the dynamo and also cause the current in the coil —15— and circuit connected thereto to become normal.

I find that the coil —41— placed in the manner described materially assists in maintaining a smooth operation of the regulator because of the additional magnetic effect produced by diverting a portion of the shunt dynamo field current therethrough, but it is evident that the same amount of resistance may be introduced in any other place in the shunt field circuit without departing from the spirit of this invention.

The operation of the regulating device, previously described, has mainly to do with the effect of the series current in the coil —15— and it is found that this will tend to make a constant flow of current, regardless of the state of the battery, that is whether it is fully charged or less so.

Since the voltage of an ordinary storage battery will vary about 25% between full charge and a safe limit of discharge, I utilize this effect in the coil —16— to cause a lesser charging rate as the battery voltage increases, or as the battery is more fully charged.

This feature of my invention operates as follows: The increased voltage of the battery causes a corresponding increase of magnetic effect between the parts —7— and —2—, which, in the manner above described, reduces the current generated by the dynamo; then, as the battery voltage varies, the charging rate varies inversely with it.

It is also evident that the wire —43— may be connected to the coil —15— at some other point, nearer to or farther from one end as may be necessary under some conditions of current output of the dynamo or battery, or current required in the lamps.

It will be noted that I have provided in a single instrument an automatic circuit breaker and an adjustable automatic regulator with means for varying the charge rate of the battery to meet actual requirements of the battery, and further means whereby any load of the working circuit will cause the dynamo to generate just enough extra current to supply the work to be done and still maintain the same charge rate to the battery.

For instance, the generator controlled by my device may be operated on a motor car during the day time and having the battery fully charged or nearly so, delivering to it a current of, say, two amperes.

Now, if from any cause, as from darkness, the lights should be needed, the dynamo then delivers enough current for the lamps and also continues to supply two amperes to the battery, thus allowing the generator to run substantially light or without load during the day time.

A core section —6— is secured to and upon the rod —7— to slide endwise toward and from the core section —2— within a non-magnetic tube —4— which surrounds both core sections and forms a suitable supporting body around which the coils —15—, —16— and —41— are wound, the outer end of the core section —2— and opposite end of the tube —4— being provided with radially projecting flanges to properly confine the coils, suitable space being left between the meeting ends of the core sections —2— and —6— to allow for the endwise movement of the last-named section.

The various parts of the regulator are inclosed within a suitable case —1— which, together with the core sections —2— and —6— are made of magnetizable material to facilitate the action of the core section —6— when the coil —16— is energized for closing the contacts —7— and —14—.

What I claim is:

1. In combination with a variable speed dynamo having a shunt field winding, a pressure-controlled variable electric resistance in series with said winding, normally separated coöperative contacts for controlling said pressure, a voltage coil connected in the dynamo circuit for closing one contact against the other contact, a storage battery having one pole connected to the dynamo and its other pole connected to said other contact, the last-named connection including therein a current coil coöperating with the first-named contact to assist the voltage coil in holding the contacts closed with greater pressure to increase said resistance when the current of the dynamo exceeds a definite value, and a translating device connected across the dynamo and battery circuits from a point intermediate the ends of said current coil so that when the contacts are closed and the voltage of the dynamo exceeds that of the battery, parts of the dynamo current may charge the battery and operate the translating device, or if the contacts are open, the translating device may be operated by the battery through the included portion of the current coil.

2. The combination with a dynamo having a shunt field winding and a storage battery connected in the dynamo circuit for charging purposes, of normally separated coöperative contacts, one of which is electrically connected to one side of the dynamo circuit, an electro-magnetic coil acting upon such contact and having one end connected to the other contact and its opposite end electrically connected to one side of the battery, a separate electro-magnetic coil acting upon the first-named contact to close the same against the second-named contact and thereby close the charging circuit, both coils being wound to act in harmony to close said contacts when energized from the dynamo, a variable resistance pile electrically connected in series with and between the first-named contact and shunt field winding of the dynamo, means for exerting pressure upon the pile and second-named contact in opposition to the pressure produced by the first-named contact when actuated by said coils, and a translating device connected across the charging circuit from a point between the ends of the first-named coil, whereby a portion of such coil will be included in the battery circuit to operate the translating device when the energy of the battery exceeds that of the dynamo.

3. The combination with a dynamo having a shunt field winding, and a storage battery connected in the dynamo circuit for charging purposes, of normally separated coöperative contacts, one of which is electrically connected to one side of the dynamo circuit, an electro-magnetic coil acting upon such contact and having one end connected to the other contact and its opposite end electrically connected to one side of the battery, a separate electro-magnetic coil acting upon the first-named contact to close the same against the second-named contact and thereby close the charging circuit, both coils being wound to act in harmony to close said contacts when energized from the dynamo, a variable resistance pile electrically connected in series with and between the first-named contact and shunt field winding of the dynamo, means for exerting pressure upon the pile and second-named contact in opposition to the pressure produced by the first-named contact when actuated by said coils, and a translating device connected across the charging circuit from a point between the ends of the first-named coil, whereby the portion of the first-named coil included in the battery circuit acting in opposition to the remaining portion of said coil to reduce the pressure of the contacts one upon the other, and thereby reduce the resistance in said pile.

4. The combination with a storage battery and a charging circuit therefor, including a variable speed dynamo and a shunt field winding, of a normally open circuit closer and an electro-magnetic coil, both connected in series in one side of the charging circuit, said coil being arranged to exert its magnetic influence toward closing the circuit closer when energized by the dynamo, a translating device connected from a point intermediate the ends of said coil across the charging circuit, a separate coil connected across said circuit between the circuit closer and dynamo and arranged to exert its influence to close said circuit closer prior to the energizing of the first-named coil, and a variable resistance device electrically connected to said circuit in series with the shunt field winding of the dynamo and controlled by the circuit closer to increase such resistance as the current strength in the coils increases.

5. A regulator for battery charging circuits comprising a circuit closer connected in one side of the charging circuit and provided with coöperative contacts, one of which is movable into and out of pressing engagement with the other, means normally separating such movable contact from the other, means for exerting pressure upon the other contact toward the movable contact, a variable electrical resistance pile normally held under compression by the second-named contact and its pressure-exerting means, said variable resistance being electrically connected to the charging circuit in such manner as to cause a reduction of the charging current as the pressure upon the resistance pile is reduced by the pressure of the contacts one against the other, means for operating the movable contact against the opposed contact comprising an electro-magnetic coil connected across the charging circuit between the circuit closer and source of current supply for the charging circuit, a separate electro-magnetic coil in the charging circuit between the circuit closer and battery and arranged to exert its influence upon the movable contact of the circuit closer for closing the same when the voltage of the charging current exceeds that of the battery, and a translating device connected from a point intermediate the ends of the last-named coil across said circuit.

In witness whereof I have hereunto set my hand on this 26 day of August, 1911.

ALBERT E. DOMAN.

Witnesses:
  A. E. BROWN,
  E. S. REMINGTON.